US008283872B2

(12) United States Patent
Moskowitz et al.

(10) Patent No.: US 8,283,872 B2
(45) Date of Patent: Oct. 9, 2012

(54) CIRCUIT ARRANGEMENT AND METHOD FOR THE OPERATION OF HIGH-PRESSURE GAS DISCHARGE LAMPS

(75) Inventors: Warren P. Moskowitz, Ipswich, MA (US); Joachim Mühlschlegel, Gröbenzell (DE)

(73) Assignee: Osram AG, Munich (DE)

( * ) Notice: Subject to any disclaimer, the term of this patent is extended or adjusted under 35 U.S.C. 154(b) by 975 days.

(21) Appl. No.: 12/086,742

(22) PCT Filed: Nov. 30, 2006

(86) PCT No.: PCT/EP2006/069139
§ 371 (c)(1),
(2), (4) Date: Jun. 16, 2008

(87) PCT Pub. No.: WO2007/068601
PCT Pub. Date: Jun. 21, 2007

(65) Prior Publication Data
US 2009/0224684 A1    Sep. 10, 2009

(30) Foreign Application Priority Data

Dec. 14, 2005 (DE) .................. 10 2005 059 763

(51) Int. Cl.
*H05B 37/02* (2006.01)
(52) U.S. Cl. .................... 315/224; 315/209 R; 315/246; 315/291; 315/307
(58) Field of Classification Search .................. 315/224, 315/225, 209 R, 246, 247, 291, 307, DIG. 4–DIG. 7
See application file for complete search history.

(56) References Cited

U.S. PATENT DOCUMENTS

| 5,404,082 | A | 4/1995 | Hernandez et al. | |
| 5,428,268 | A | 6/1995 | Melis et al. | |
| 6,483,252 | B2 | 11/2002 | Bruning | |
| 7,023,143 | B2* | 4/2006 | Harada et al. | 315/209 R |
| 2003/0111968 | A1 | 6/2003 | Trestman | |
| 2008/0156649 | A1* | 7/2008 | Sams | 204/554 |

FOREIGN PATENT DOCUMENTS

| DE | 42 34 358 | 2/1993 |
| EP | 0 081 884 | 6/1983 |
| JP | 06318496 A | 11/1994 |
| JP | 09199284 A | 7/1997 |
| JP | 2004055512 A | 2/2004 |
| JP | 2004515894 A | 5/2004 |
| JP | 2005216865 A | 8/2005 |
| WO | WO 02/47444 | 6/2002 |
| WO | WO 03/059022 | 7/2003 |

OTHER PUBLICATIONS

English translation of the 1st Office Action in corresponding Chinese Patent Application No. 200680046894.1 dated Jun. 24, 2011.

* cited by examiner

*Primary Examiner* — Tuyet Thi Vo
(74) *Attorney, Agent, or Firm* — Cozen O'Connor

(57) ABSTRACT

A circuit arrangement for supplying a lamp wattage on a high-pressure gas discharge lamp in the form of an alternating current having an operating frequency, said operating frequency being frequency-modulated within large limits such that no acoustic resonances are embodied in the lamp. Amplitude modulation through the frequency response of an interface is compensated by modulating an amplitude of a supply voltage.

13 Claims, 3 Drawing Sheets

CIRCUIT ARRANGEMENT AND METHOD FOR THE OPERATION OF HIGH-PRESSURE GAS DISCHARGE LAMPS

RELATED APPLICATION

This is a U.S. national stage of application No. PCT/EP2006/069139, filed on 30 Nov. 2006.

This application claims the priority of German patent application no. 10 2005 059 763.7 filed Dec. 14, 2005 the content of which is hereby incorporated by reference.

FIELD OF THE INVENTION

The invention relates to a circuit arrangement for operating high-pressure gas discharge lamps. In the text which follows, high-pressure gas discharge lamps will also be called lamps in brief. Furthermore, the invention relates to a method for operating such lamps. In particular, the invention deals with avoiding acoustic resonances which may occur during the operation of these lamps.

BACKGROUND OF THE INVENTION

Acoustic resonances are a familiar problem in the operation of high-pressure gas discharge lamps. Depending on the geometry and on the pressure in the lamp, these resonances occur in a frequency range between 5 kHz and 1000 kHz and can lead to arc irregularity and even to the destruction of the lamp in the case of distinct resonances. Operating a lamp with an alternating current which has a frequency in said frequency range is therefore not absolutely reliable.

For this reason, operating devices which operate the lamp in so-called squarewave mode have become widely used on the market. However, the squarewave mode requires great circuit complexity which is why there are efforts to operate the lamp in so-called high frequency mode in spite of the risk of acoustic resonances. In this mode, the lamps are supplied with an alternating current in the specified frequency range because an operating device can be implemented particularly cost-effectively especially in this frequency range.

In the document US 2003/0111968A1 (Trestman), an operating device is described which operates a lamp at an operating frequency which is frequency modulated. In this arrangement, a frequency range is selected in which the lamp does not have any distinct acoustic resonances. So that these weak resonances are not excited, the operating frequency is continuously varied around a center frequency within a range of 50 kHz. The modulation is controlled by a residual ripple of a supply voltage. The document specified talks about a constant supply voltage which has an actually unwanted residual ripple of, for example, 6 Vrms which is caused by a feeding line voltage. Due to the rectification, the residual ripple has 120 Hz at a line frequency of 60 Hz. The lamp current thus has an operating frequency which is modulated by +/−50 kHz with a modulation frequency of 120 Hz.

The disadvantageous factor in the prior art described is that a frequency range must be found in which the lamp only has weak resonances. The operating frequency range covered by the modulation thus avoids frequency ranges in which strong major resonances of the lamp to be operated occur. The result in the prior art is that a frequency range in which the operating frequency occurs must be adapted to the lamp to be operated. The prior art does not guarantee that two lamps which have comparable performance data can be operated on the same operating device.

SUMMARY OF THE INVENTION

One object of the present invention is to provide a circuit arrangement by means of which a cost-effective operating device can be implemented which is capable of operating different lamps without exciting acoustic resonances.

This object is achieved by one aspect of the present invention directed to a circuit arrangement which has the following features:
an inverter which is supplied with a supply voltage which obtains its energy from a line voltage,
the inverter supplies to the high-pressure gas discharge lamp a lamp current which is essentially an alternating current with a modulated operating frequency which continuously oscillates within a range between a minimum frequency and a maximum frequency,
a coupling network which is connected between the inverter and the lamp and has a transfer function which describes the dependence of the amplitude of the lamp current on the operating frequency,
the difference between maximum frequency and minimum frequency is at least 10 kHz,
and that, during lamp operation, the supply voltage has a maximum value and a minimum value,
the difference between maximum value and minimum value being at least 50 V.

The distinctness of the resonance points of the lamp generally decreases with increasing frequency. I.e., at low frequencies, it is critical to supply the lamp with a large amount of energy since strong resonances can form. At higher frequencies, in contrast, the lamp can be fed with more energy since the resonances are less distinct there.

The coupling network generally has a low-pass characteristic. I.e. the lamp is fed with more energy at low frequencies than at high frequencies. The frequency-dependence of the coupling network can trigger the instability of the lamp because it is especially those frequencies at which strong resonances occur which are less damped. It follows from this that the frequency-dependence of the coupling network must be compensated for. According to an embodiment of the invention, this is done by means of a strong modulation of the supply voltage. In the time domain, the frequency-dependence of the coupling network causes a drop in amplitude of the lamp current with increasing frequency. In the frequency domain, the frequency-dependence of the coupling network appears in the power spectrum of the lamp line in such a manner that the spectral power density decreases towards higher frequencies. The strong modulation of the supply voltage according to an embodiment of the invention has the result that the amplitude of the lamp current is approximately independent of the operating frequency or even increases towards higher frequencies. In the frequency domain, the invention can have the result that the power spectrum of the lamp power is uniformly distributed or even increases towards higher frequencies.

Apart from the instability of the lamp, the wide frequency range covered by the operating frequency results in a further problem. Without modulation of the supply voltage according to an embodiment of the invention, the frequency-dependence of the coupling network produces an amplitude modulation of the lamp current. Without countermeasure, this leads to an unwanted flickering of the light flux with the modulation frequency.

According to an embodiment of the invention, the supply voltage extends between a maximum value and a minimum value which differ by at least 50 V. This compensates for the transfer function of the coupling network. In said prior art, it is attempted to keep the variation of the supply voltage with time as constant as possible. In this context, the modulation of the supply voltage by itself, i.e. without modulation of the operating frequency, does not lead to a noticeable modulation of the lamp current and thus of the light flux of an operated lamp.

The supply voltage is generally generated from a rectified line voltage which has twice the line frequency. In the prior art, it is attempted to filter the doubled line frequency as completely as possible. Since this is not possible with supportable complexity, the supply voltage has a residual modulation of its amplitude with double the line frequency. Although the residual modulation is low, it is sufficient for driving a modulator which produces the frequency modulation of the operating frequency.

In contrast, the circuit arrangement according to an embodiment of the invention produces a variation of the supply voltage with time which by itself, i.e. without modulation of the operating frequency, definitely produces a modulation of the lamp current and thus of the light flux. However, the modulation of the lamp current by the modulation of the supply voltage counteracts the modulation of the lamp current by the frequency modulation of the operating frequency. Both modulations compensate one another.

It is also advantageous if the modulation of the supply voltage is greater than would be necessary for compensating for the frequency modulation of the operating frequency. Overcompensation is then present. This case can be subdivided into two cases, each one of which has its own advantages.

If a modulator characteristic is selected at which all possible operating frequencies between the maximum frequency and the minimum frequency are essentially generated by the inverter for an equal length of time, the overcompensation has the effect that more energy is coupled into the lamp with increasing operating frequency. This has an advantageous effect on the stability of the lamp operation since resonance points of the lamp are tangentially damped more with increasing frequency. The lamp thus converts more energy at operating frequencies at which the resonance points of the lamp are damped more.

If a modulator characteristic is selected which can neutralize overcompensation in order to render the power spectrum of the lamp power essentially equally high at all operating frequencies, the period in which the inverter generates a particular operating frequency decreases with increasing frequency. I.e. the switching transistors of the inverter are clocked with high frequencies for a shorter time than would be the case without overcompensation. This leads to a reduction in switching losses in the switching transistors. In this context, high frequencies are understood to be frequencies which are closer to the maximum frequency than to the minimum frequency. Thus, overcompensation can be utilized for stabilizing the lamp operation or for improving the efficiency of the circuit arrangement. Mixed forms are also possible in which both advantages are utilized by neutralizing the overcompensation only partially by means of a modulator characteristic.

Generally, it is not necessary to use the line frequency for controlling a modulator. Another frequency can also be used which is lower than approx. 1000 Hz and is thus below the frequency range in which resonances occur. It is also not necessary for the modulation of the operating frequency to be periodic. The modulation can be controlled, for example, by a noise generator or by chaos.

Since the supply voltage generally already has an amplitude modulation at twice the line frequency, it is advantageous to utilize this modulation. For this purpose, the variation of the supply voltage with time is supplied to a modulator input. A modulator output controls the frequency provided by an oscillator as operating frequency. The modulator can convert the variation of the supply voltage with time differently into a variation of the operating frequency with time. Since the coupling network in most cases has a low-pass characteristic and therefore attenuates greatly at high operating frequencies, it is advantageous that the modulator sets the maximum frequency at the maximum of the supply voltage.

The relationship between operating frequency and supply voltage defines a modulator characteristic. In the simplest case, the modulator characteristic represents a linear relationship with a modulation factor between operating frequency and supply voltage. With a desired frequency swing of the operating frequency, a necessary amplitude modulation of the supply voltage is obtained with a given coupling network in order to meet the abovementioned condition of compensation. Accordingly, the modulation factor must be set in such a manner that the condition of compensation is met. The variation of the modulation supply voltage with time is generally approximately sinusoidal. With a linear modulator characteristic, the variation of the operating frequency with time is then also sinusoidal.

In dependence on a modulator characteristic, a different frequency variation of the power or also power density spectrum of the lamp power is obtained. Since generally a uniformly distributed power spectrum is desired, the modulator characteristic is designed in such a manner that this is achieved. Neglecting the frequency-dependence of the transfer function of the coupling network, this requires a triangular or sawtooth-shaped variation of the operating frequency with time so that each frequency value is set for an equal length of time. Taking into consideration the frequency-dependence of the transfer function of the coupling network, a variation of the operating frequency with time deviating from the triangular shape or sawtooth shape must be selected.

The control of the operating frequency by the modulator can be extended to form a closed-loop control of the operating frequency. For this purpose, the modulator needs a measurement input which is fed with a measured quantity for the amplitude of the lamp current or the power of the lamp. In dependence on the measured quantity, the modulator adjusts its modulator characteristic or its modulation factor in such a manner that the measured quantity remains constant. For a frequency swing according to the invention, attention must be paid to the fact that a sufficiently large amplitude modulation of the supply voltage is given.

The amplitude modulation of the supply voltage can be adjusted in most cases by selecting the value of a storage capacitor. The storage capacitor is connected in parallel with the output of a device which provides the supply voltage. In the simplest case, this device consists of a rectifier which is coupled to the line voltage. In most cases, the supply voltage is provided by a circuit for power factor correction. The amplitude modulation of the supply voltage can then also be adjusted by the control characteristics of the circuit for power factor correction.

There are metal halogen high-pressure lamps with a wattage of 20 W, 35 W, 70 W, 150 W and higher on the market. For 20 W lamps, a minimum frequency of 400 kHz and a maximum frequency of 500 kHz has been found to be advantageous. For 35 W lamps, a minimum frequency of 300 kHz and a maximum frequency of 400 kHz has been found to be advantageous. For 70 W lamps, a minimum frequency of 220 kHz and a maximum frequency of 320 kHz has been found to be advantageous. For 150 W lamps, a minimum frequency of 160 kHz and a maximum frequency of 260 kHz has been found to be advantageous. The frequency values specified are only intended to be examples of dimensioning. If an operating device is intended to be suitable for a number of lamps having different nominal wattage, a compromise must be selected in deviation from the respective optimum frequency range.

To extend the power spectrum, in which power is supplied to the lamp, without changing the minimum or maximum frequency, the inverter superimposes on the lamp current a DC component, the sign of which changes with an alternating frequency which is lower than one tenth of the minimum frequency. The DC component is advantageously generated by a bridge circuit, the switches of which have a duty ratio which deviates from 50%. The widely used half-bridge inverter comprises a first and a second switch. If a first on-time of the first switch is equal to a second on-time of the second switch, the half-bridge inverter generates a square-wave voltage without DC component. If the first on-time is reduced by an asymmetry time whereas the second on-time is extended by this asymmetry time, alternating voltage generated by the half-bridge inverter contains a DC component. To avoid unilateral loading of the lamp, the asymmetry time is alternatingly subtracted from and added to the first and the second on-time with the alternating frequency. The change in asymmetry does not need to be abrupt. Lower loading on the components used is obtained if the change from subtracting to adding the asymmetry time is continuous. For example, the variation of the value of asymmetry times with time can be triangular. At each point in time, the sum of the asymmetry times of the first and of the second switch is zero.

Without DC component, the power spectrum of the lamp power comprises components in a frequency range between twice the minimum frequency and twice the maximum frequency. Adding the DC component additionally produces components in a frequency range between the minimum frequency and the maximum frequency. Components above twice the maximum frequency are also produced which, however, generally do not play a role with regard to a stable lamp operation. If twice the minimum frequency is greater than the maximum frequency, a spectral gap is produced between the maximum frequency and twice the minimum frequency in which no power is delivered to the lamp. The minimum frequency and the maximum frequency are advantageously selected in such a manner that particularly distinct resonances of the lamp fall within this spectral gap.

BRIEF DESCRIPTION OF THE DRAWINGS

In the text which follows, the invention will be explained in greater detail by means of exemplary embodiments shown in the drawings, in which.

DETAILED DESCRIPTION OF THE DRAWINGS

Figure 1:
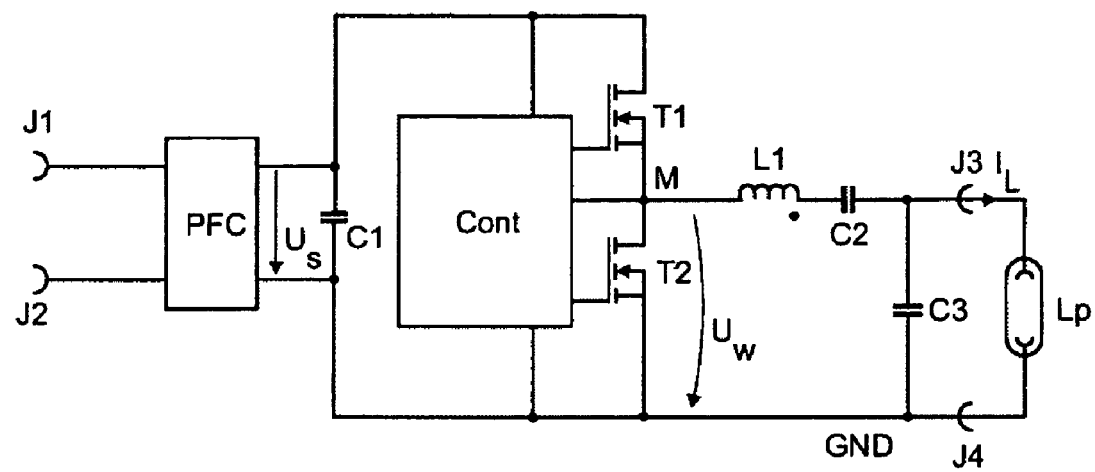
FIG. 1 shows a basic circuit diagram for a circuit arrangement by means of which the invention can be implemented.

FIG. 1 shows a basic circuit diagram of a circuit arrangement by means of which the present invention can be achieved. The circuit arrangement has two input terminals J1 and J2 to which a rectified line voltage can be connected. The input terminals J1 and J2 are coupled to a PFC stage which produces power factor correction and provides a supply voltage Us. A storage capacitor C1 which is intended to buffer the supply voltage Us is connected in parallel with the supply voltage Us. A value of 4.7 microfarad has been found to be advantageous for the storage capacitor C1 for operating a 70 W lamp. With this value, the supply voltage attains an alternating component by means of which the invention can be implemented. A potential of the supply voltage is used as reference potential GND for the circuit arrangement.

The supply voltage provides the power supply for an inverter which is constructed as half-bridge inverter. It comprises the series circuit of an upper and a lower switch T1 and T2 which are connected in parallel with the supply voltage. The switches are constructed as MOSFETs, but can also be constructed as other semiconductor switches. The source of the upper switch T1 is connected to the drain of the lower switch at the junction M. The control terminals of the switches, the gates of T1 and T2 in the present case, are connected to a control device Cont. The control device Cont is also connected to the junction M, the supply voltage Us and the reference potential GND. The control device Cont comprises an oscillator which generates an operating frequency by means of which the gates of the switches T1 and T2 are alternately driven. By this means, a rectangular alternating voltage Uw, the amplitude of which follows the supply voltage and corresponds to the frequency of the operating frequency is produced at the junction M with respect to the reference potential GND. The alternating voltage Uw represents the inverter output voltage of the half-bridge inverter.

A series circuit consisting of a lamp choke L1 and two capacitors C2 and C3 forms a coupling network which is connected between the junction M and the reference potential GND. A lamp Lp can be coupled to the capacitor C3 via terminals J3 and J4. An ignition device which provides a high voltage for a short time for starting the lamp is not shown.

The coupling network produces an impedance transformation from the alternating voltage Uw to the lamp. It can also contain a transformer. The impedance transformation of the coupling network has a transfer function which describes the frequency-dependence of the lamp current I1 referred to the alternating voltage Uw. In the present case, the transfer function has a band-pass characteristic. In general, the operating frequency is always above the resonant frequency of the transfer function so that a reduction of the switching load on the switches S1 and S2 can be utilized. Above the resonant frequency, the transfer function has a low-pass characteristic.

The control device Cont comprises a modulator with a modulator output. The modulator output is coupled to the oscillator in such a manner that the operating frequency of the modulator can be influenced. The modulator is controllable via a modulator input which is coupled to the supply voltage. This results in an operating frequency which is dependent on the supply voltage. In the simplest case, the modulator consists of a resistor which is connected between the supply voltage and a point in the oscillator in which a quantity is present which influences the operating frequency. The modulator can also be implemented by a microcontroller in which a modulator characteristic is deposited by a software. In an optimization process, the modulator characteristic can also be tuned to a lamp to be operated. Other frequency-dependent effects which are not based in the coupling network can also be taken into consideration in the modulator characteristic. For example, feed lines or the lamp itself can exhibit a frequency-dependence.

Figure 2:
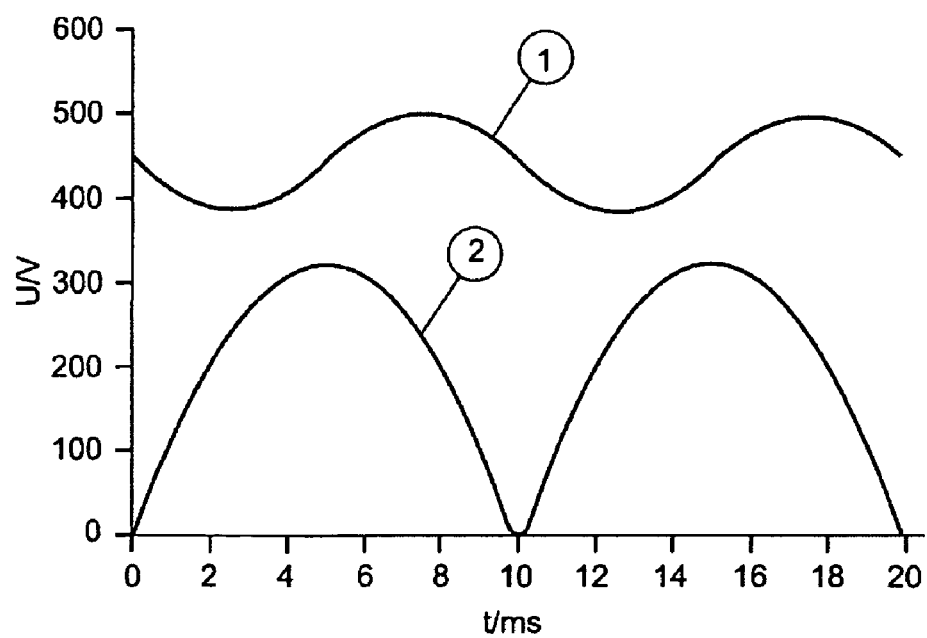
FIG. 2 shows the variation of a supply voltage and of a rectified line voltage with time.

FIG. 2 shows in curve 2 the variation with time of a rectified line voltage which can be measured at terminals J1 and J2 from FIG. 1. In the example, this is a 230 Vrms line voltage with a line frequency of 50 Hz. Curve 2 shows a variation with time of the supply voltage Us from FIG. 1 by way of example. In the prior art described, the alternating voltage component of the supply voltage has an amplitude of just 12 Vpp. In general, the expert in the field will also attempt to keep the supply voltage as constant as possible. In the present invention, the storage capacitor C1 and/or the control of the power factor circuit PFC is selected in such a manner that a much stronger fluctuation than in the prior art is produced. In the example of FIG. 2, the supply voltage Us exhibits a sinusoidal amplitude modulation between approx. 300 V and approx. 500 V. This results in an amplitude of the alternating-voltage component of the supply voltage of approx. 120 Vpp. I.e. the difference of maximum values and minimum value of the supply voltage is 120 V. Investigations have shown that a stable and flicker-free operation of various lamps is possible above a difference of 50 V and a difference between maximum frequency and minimum frequency of 10 kHz.

Figure 3:
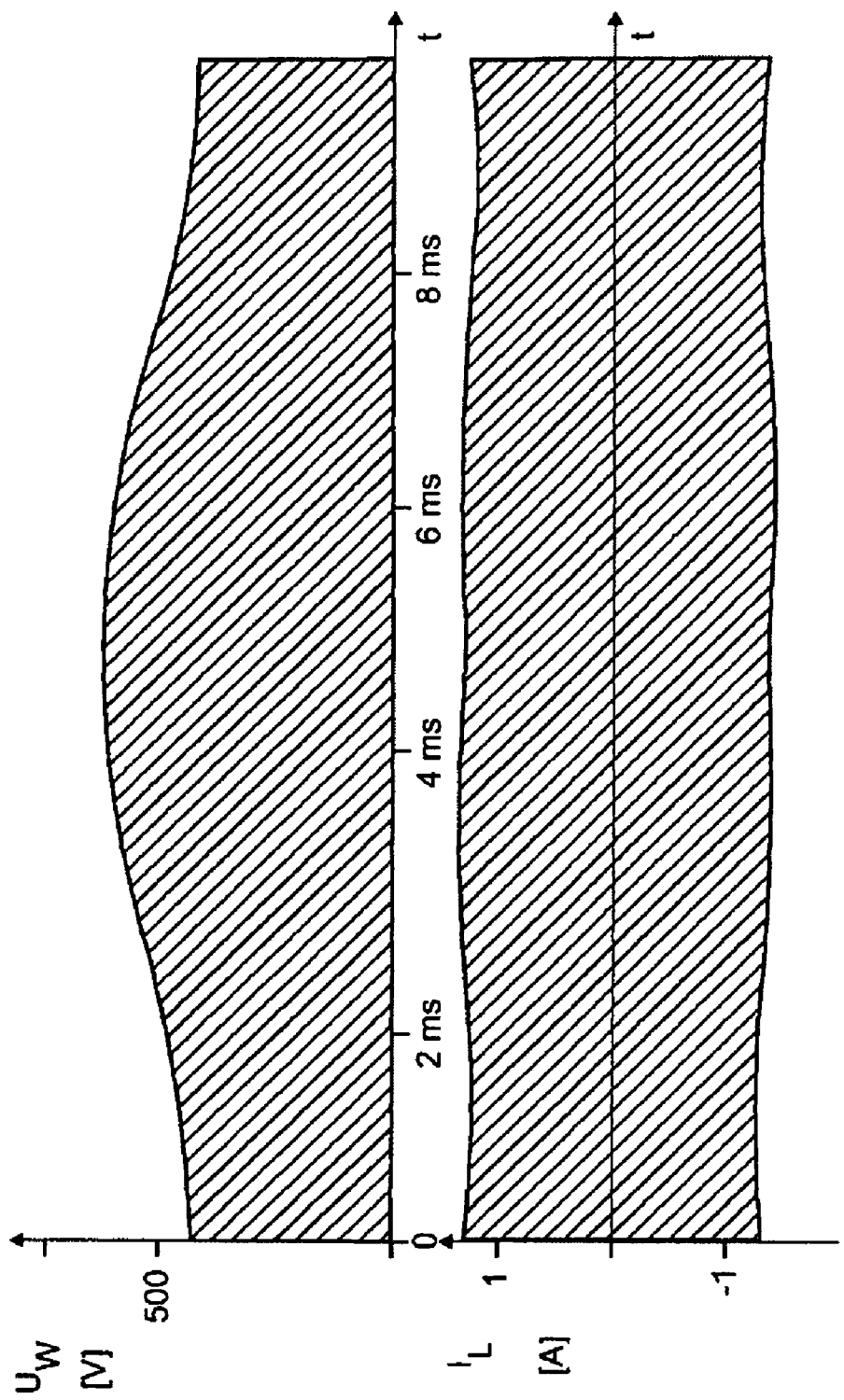
FIG. 3 shows the variation of an inverter output voltage and of a lamp current with time.

FIG. 3 shows in its upper part the variation with time of the envelope of the inverter output voltage Uw from FIG. 1. The lower boundary of the envelope is zero and corresponds to the voltage which is present at the junction M when the switch T2 is closed. The upper boundary of the envelope corresponds to the voltage which is present at the junction M when the switch T1 is closed. It can be seen clearly how the upper boundary of the envelope follows the value of the supply voltage from FIG. 2.

In its lower part, FIG. 3 shows the variation with time of the envelope of the lamp current I1 from FIG. 1. Both the lower boundary and the upper boundary of the envelope of the lamp current I1 scarcely show fluctuations although the amplitude of the inverter output voltage Uw exhibits strong modulation as shown in the upper part of FIG. 3. This is advantageously achieved by the fact that the amplitude modulation of the inverter output voltage Uw is just strong enough for the transfer function of the coupling network, in conjunction with a frequency modulation of the operating frequency, to be compensated for.

Figure 4A:
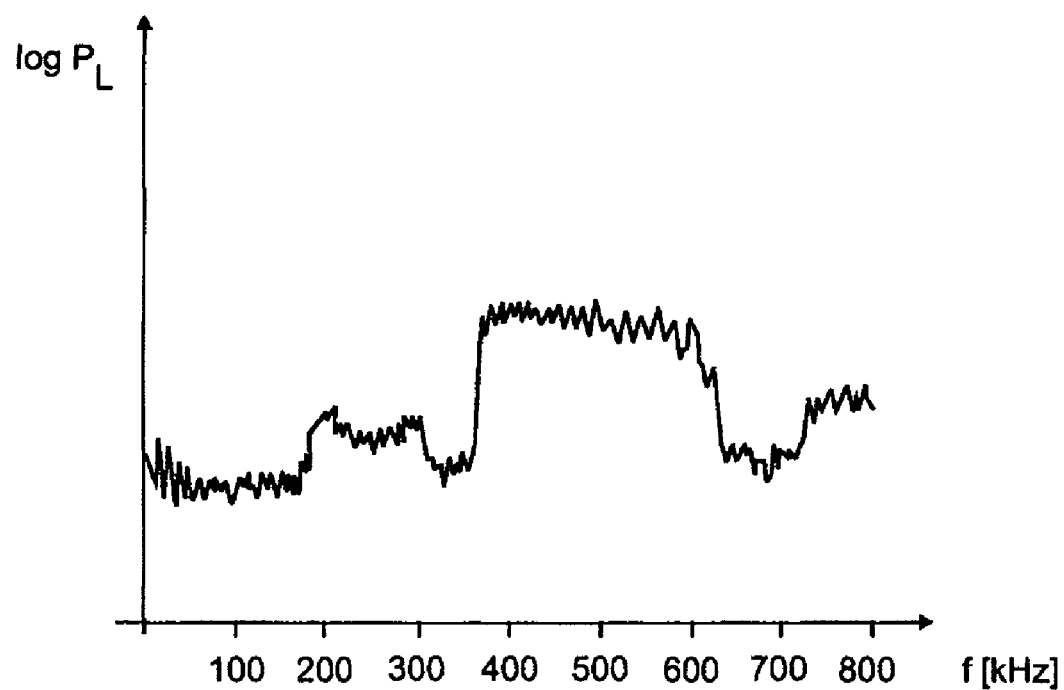
FIG. 4 shows the spectral power density of the lamp power with strong and weak DC component.

FIG. 4a shows the spectral power density log PL of the power fed into the lamp Lp in a logarithmic representation. In comparison with the spectrum of the lamp current I1, the frequencies occurring in the power spectrum are doubled. The frequency band between 360 kHz and 620 kHz resulting from a frequency modulation of the operating frequency between a minimum frequency of 180 kHz and a maximum frequency of 310 kHz can be seen clearly. The power density is essentially constant in this frequency band. This is an advantageous consequence of the compensation for the transfer function of the coupling network.

Figure 4B:
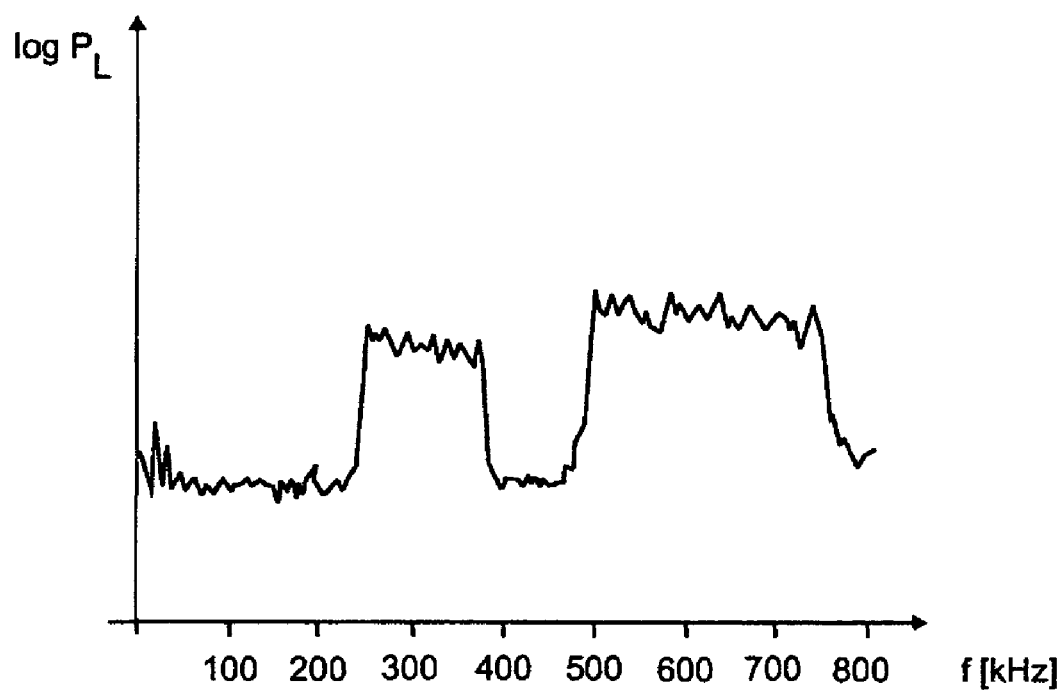

Between 180 kHz and 310 kHz, FIG. 4a shows a further frequency band in which power is coupled into the lamp. This frequency band is produced by the DC component, described above, which is superimposed on the lamp current I1. The amplitude of this frequency band is dependent on the value of the superimposed DC component. In FIG. 4a, the DC component is only slight. FIG. 4b shows a further example of a power density spectrum of a lamp power in which a stronger DC component was selected.

In FIG. 4a, the start of a further frequency band can be seen which begins at 720 kHz. This frequency band is produced by the quadrupling of the fundamental frequencies such as minimum frequency and maximum frequency.

The invention claimed is:

1. A circuit arrangement for providing a lamp power to a high-pressure gas discharge lamp comprising:
an inverter which is supplied with a supply voltage, the supply voltage obtaining its energy from a line voltage for operating a high-pressure gas discharge lamp, wherein the inverter supplies to the high-pressure gas discharge lamp a lamp current which is essentially an alternating current with a modulated operating frequency which continuously oscillates within a range between a minimum frequency and a maximum frequency; and
a coupling network which is connected between the inverter and the lamp and has a transfer function which describes the dependence of the amplitude of the lamp current on the operating frequency,
wherein the difference between maximum frequency and minimum frequency is at least 10 kHz, and
wherein during lamp operation, the supply voltage has a maximum value and a minimum value, the difference between maximum value and minimum value being at least 50 V.

2. The circuit arrangement as claimed in claim 1, comprising a modulator input which is coupled to the supply voltage or the line voltage and a modulator output which is coupled to an oscillator which generates the operating frequency, the variation with time of the supply voltage or of the line voltage controlling the variation with time of the operating frequency via the modulator.

3. The circuit arrangement as claimed in claim 1, wherein the variation with time of the supply voltage and the variation with time of the operating frequency are synchronized in such a manner that when the operating frequency assumes its maximum, the supply voltage also assumes its maximum.

4. The circuit arrangement as claimed in claim 1, wherein the power spectrum of the power of an operated lamp is uniformly distributed.

5. The circuit arrangement as claimed in claim 1, comprising a modulator which has a measurement input which is coupled to a measured quantity for the amplitude of the lamp current and has a modulator output which is coupled to an oscillator which generates the operating frequency, the modulator setting an operating frequency which produces an approximately constant amplitude of the lamp current.

6. The circuit arrangement as claimed in claim 1, wherein a circuit for power factor correction provides the supply voltage.

7. The circuit arrangement as claimed in claim 1, wherein the minimum frequency for a 70 W lamp is between 130 kHz and 250 kHz and the maximum frequency is between 170 kHz and 400 kHz.

8. The circuit arrangement as claimed in claim 1, wherein the inverter produces a lamp current which contains a direct-current component which alternates its sign with an alternating frequency which is less than one tenth of the minimum frequency.

9. The circuit arrangement as claimed in claim 1, wherein the inverter comprises a first and a second electronic switch, the first switch being switched on during a first on-time and the second switch being switched on during a succeeding second on-time,
wherein the first and second on-time is in each case composed of a fundamental time and an asymmetry time, the fundamental times being identical for both on-times whilst the asymmetry times are identical in amount but have different signs, and
wherein the asymmetry times exhibit a variation with time with an alternating frequency which is less than one tenth of the minimum frequency.

10. The circuit arrangement as claimed in claim 1, wherein the power spectrum of the power of an operated lamp rises monotonously with the frequency.

11. The circuit arrangement as claimed in claim 2, wherein the modulator establishes a linear relation between supply voltage and operating frequency.

12. The circuit arrangement as claimed in claim 1, wherein the variation with time of the operating frequency is periodic.

13. The circuit arrangement as claimed in claim 12, wherein the variation with time of the operating frequency is sinusoidal, triangular or sawtooth-shaped.

* * * * *